United States Patent

Notley

[15] 3,707,001

[45] Dec. 19, 1972

[54] MAGNETIC IMAGING METHODS AND APPARATUS

[72] Inventor: Norman Notley, Pasadena, Calif.

[73] Assignee: Bell & Howell Company, Chicago, Ill.

[22] Filed: Nov. 12, 1970

[21] Appl. No.: 88,782

[52] U.S. Cl. ....................346/74 MT, 340/174.1 M

[51] Int. Cl....G11b 11/04, G11b 11/10, G11b 11/14

[58] Field of Search ..........346/74 MT; 340/174.1 M

[56] References Cited

UNITED STATES PATENTS

| | | | |
|---|---|---|---|
| 3,582,570 | 6/1971 | Cushner | 346/74 MT |
| 3,582,877 | 6/1971 | Benoit | 346/74 MT |
| 3,512,170 | 5/1970 | Nelson | 346/74 MT |

*Primary Examiner*—Howard W. Britton
*Attorney*—Luc P. Benoit

[57] ABSTRACT

A method of producing a magnetic image of an information pattern provides a magnetizable medium having a transition between a first state of magnetization and a second state of magnetization at a first temperature and a transition between the second state of magnetization and the first state of magnetization at a second temperature. This method also includes the steps of imparting to the magnetizable medium a third temperature between the first and second temperatures so as to provide one of the two states of magnetization, and imparting with the aid of a thermal image of the information pattern to portions of the medium which are representative of the information pattern the third temperature so as to provide at these portions the other of the two states of magnetization. Apparatus for carrying out this imaging method and producing records of an information pattern are also disclosed.

9 Claims, 2 Drawing Figures

INVENTOR.
NORMAN T. NOTLEY
BY [signature]
ATTORNEY.

MAGNETIC IMAGING METHODS AND APPARATUS

BACKGROUND OF THE INVENTION

1. Field of the Invention

The subject invention relates to magnetic imaging and, more particularly, to methods and apparatus for providing magnetic images with the aid of thermomagnetic phenomena.

2. Description of the Prior-Art

Magnetic imaging has been subject to serious investigation in recent years, since it has several advantages over more conventional imaging techniques.

For instance, magnetic imaging offers the prospect of an avoidance of time-consuming and delicate chemical processing steps now required in conventional photography. Magnetic imaging also offers the prospect of an avoidance of expensive and potentially dangerous high-voltage equipment now required in electrostatic xerography and related techniques.

Magnetic imaging is, however, beset by various problems that retard its practical application. Problems that are due to phenomena inherent in the magnetization process are particularly difficult to overcome.

This is, for instance, the case with the undesired remagnetization occurring in imaging methods that rely on an information-wise demagnetization of a premagnetized recoding medium. As is apparent from C.D. Mee, THE PHYSICS OF MAGNETIC RECORDING (North-Holland Publishing Company, 1964) pp. 80–84, magnetizable media that are cooled through a transition point in the presence of a magnetic field acquire a strong magnetization through operation of the phenomenon known as thermoremanent magnetization. Accordingly, if a premagnetized recording medium is subjected to image-wise demagnetization by selective heating through a transition region, such as the Curie point, the information-representative demagnetized portions are at least partially remagnetized by the surrounding magnetic field arising from the premagnetized regions as these heated portions cool back through the transition temperature region. Since the magnetically attractable particles in magnetic inks, toners or other printout agents cannot effectively distinguish between magnetic fields provided by premagnetization and magnetic fields provided by remagnetization, it follows that resolution and quality of the image are severely impaired.

Another drawback delays the utilization of materials, such as certain chromium-manganese antimonides, that display magnetic and nonmagnetic properties within temperature ranges adjustable by their composition. A serious problem existing in this area becomes apparent if we assume by way of example that selected portions of a material of the latter type which represent the information to be imaged are heated from a lower temperature at which they are nonmagnetic to a higher temperature at which they are ferromagnetic, and are then magnetized to provided the desired magnetic image. Since these magnetized portions have a higher temperature, heat will flow from these portions to the remainder of the magnetic recording medium, resulting in a destruction of the magnetic image by cooling of the particular portion back to the nonmagnetic temperature region.

SUMMARY OF THE INVENTION

The subject invention overcomes or materially alleviates the above mentioned disadvantages and proceeds from the recognition that problems which arise from phenomena that are inherent in the magnetic medium are most effectively countered by solutions which exploit other inherent phenomena.

From one aspect thereof, the subject invention resides in a method of providing a magnetic image of an information pattern, comprising in combination the steps of providing a magnetizable medium having a transition between a first state of magnetization and a second state of magnetization at a first temperature and a transition between said second state of magnetization and said first state of magnetization at a second temperature, imparting to said medium a third temperature between said first and second temperatures so as to provided one of said first and second states of magnetization, providing a thermal image of said information pattern, and imparting with the aid of said thermal image to portions of said medium representative of said information pattern said third temperature so as to provide at said portions the other of said first and second states of magnetization.

From another aspect thereof, the subject invention resides in a method of providing a magnetic image of an information pattern, comprising in combination the steps of providing a magnetizable medium displaying a transition from a magnetic state to a substantially nonmagnetic state at a first temperature upon heating of the medium, and a transition from said nonmagnetic state to said magnetic state at a second temperature below said first temperature upon cooling of the medium, magnetizing said medium and heating said medium from below said second temperature to a third temperature between said first and second temperatures, providing a thermal image of said information pattern, and imparting said thermal image on said magnetized medium so as to cycle portions of said magnetized medium representative of said information pattern from said third temperature through said first temperature, whereby said medium portions are demagnetized, and back through said first temperature to said third temperature, whereby said demagnetized medium portions remain demagnetized.

The subject invention also resides in apparatus for providing a record of an information pattern, comprising in combination a magnetizable medium having a transition between a first state of magnetization and a second state of magnetization at a first temperature and a transition between said second state of magnetization and said first state of magnetization at a second temperature, means operatively associated with said magnetizable medium for imparting to said medium a third temperature between said first and second temperatures to provide one of said first and second states of magnetization, means for providing a thermal image of said information pattern, means operatively associated with said magnetizable medium for imparting with the aid of said thermal image to portions of said medium representative of said information pattern said third temperature and the other of said first and second states of magnetization to provide a magnetic image of said information pattern, and means operatively associated with said magnetizable medium for printing out said magnetic image.

The subject invention further resides in apparatus for providing a record of an information pattern, comprising in combination a magnetizable medium displaying a transition from a magnetic state to a substantially nonmagnetic state at a first temperature upon heating of the medium, and a transition from said nonmagnetic state to said magnetic state at a second temperature below said first temperature upon cooling of the medium, means operatively associated with said magnetizable medium for magnetizing said medium, means operatively associated with said magnetizable medium for heating said medium from below said second temperature to a third temperature between said first and second temperatures, means for providing a thermal image of said information pattern, means operatively associated with said magnetizable medium for cycling, with the aid of said thermal image, portions of said magnetized medium representative of said information pattern from said third temperature through said first temperature and back through said first temperature to said third temperature whereby said medium portions are demagnetized and together with the remainder of said medium provide a magnetic image of said information pattern, and means operatively associated with said magnetizable medium for printing out said magnetic image.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figure 1:
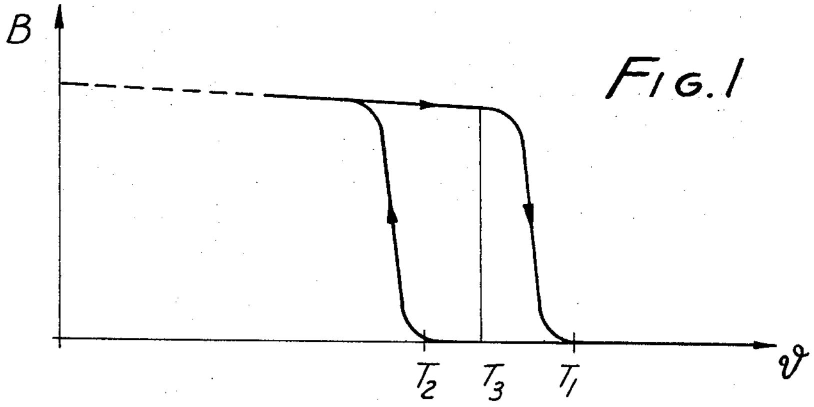
FIG. 1 is a temperature-versus-magnetization plot of a group of magnetizable media useful in the practice of the subject invention.

The temperature-versus-magnetization plot of FIG. 1 is illustrative of the magnetic behavior of a number of magnetizable media that have a transition between a first state of magnetization and a second state of magnetization at a first temperature $T_1$ and a transition between the second state of magnetization and the first state of magnetization at a second temperature $T_2$. In particular, FIG. 1 is illustrative of magnetizable media that have a transition between a magnetic and a substantially nonmagnetic state at a first temperature $T_1$ and a transition between the nonmagnetic state and the magnetic state at a second temperature $T_2$ below the temperature $T_1$.

By way of example, FIG. 1 may be illustrative of a material that has a first Curie point $T_1$ upon heating and a second Curie point $T_2$ upon cooling. In practical terms, this temperature hysteresis permits magnetic and nonmagnetic states to exist side by side in the same material. For instance, portions of the material that have been heated to a temperature $T_3$ from a temperature below $T_2$ are magnetic, while adjacent portions of the material that have been cooled to the temperature $T_3$ from a temperature above $T_1$ are nonmagnetic.

Several materials are know that exhibit a temperature hysteresis of the type shown in FIG. 1, as is for instance apparent from Sweeny and Scott, Curie Point Transitions in Phosphides and Arsenides of Manganese, Journal of Chemical Physics, Vol. 22, No. 5, (May, 1954,) pp. 917–21, and the literature cited therein. By way of example, the alloy manganese arsenide (MnAs) has a Curie point transition at 45° C for heating and a Curie point transition of 36° C for cooling. The Curie temperature of an MnAs composition of 47 mole percent As content are 40° C for heating and 31° C for cooling. Several ferromagnetic forms rather than a solid solution often exist in a composition and provide several Curie transition points. By way of example, and not by way of limitation, an MnAs composition of 47.4 mole percent As content displays two Curie point transitions at 40° C and 45° C for heating and two Curie point transitions at 36° C and 31° C for cooling, with the 40° C and 31° C transitions being, however, more pronounced than the changes at 45° C and 36° C. In the latter case, the temperature $T_3$ is preferably about 38° C, which is well between 36° C and 40° C.

By way of further example, MnBi alloys display a Curie transition at about 360° C for heating and about 340° C for cooling for a wide range of Mn content. Data on further materials which have a temperature hysteresis at magnetic transition regions have been published. MnAs alloys are, however, presently believed to be the best materials for present purposes in terms of working temperatures and attainable magnetic moments.

Figure 2:
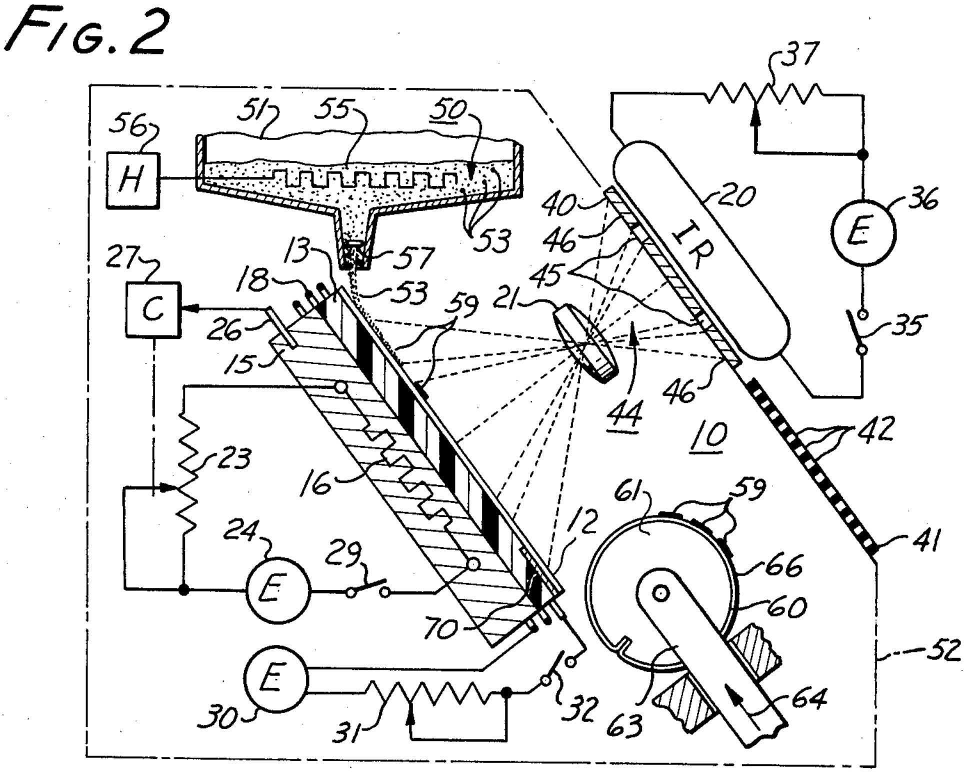
FIG. 2 is a section through an apparatus in accordance with a preferred embodiment of the subject invention.

The copying apparatus 10 of FIG. 2 includes a magnetizable medium 12 located on a substrate 13 and having hysteretic temperature characteristics of the type illustrated in FIG. 1.

As mentioned above, this behavior is for instance displayed by the MnAs alloy which has an upper Curie transition at 45° For heating and a lower Curie transition at 36° C for cooling.

The copying apparatus 10 includes a heating platen 15 with a heater element 16 for preheating the medium 12 to the temperature $T_3$ shown in FIG. 1. The apparatus 10 further includes an electrically energizable magnetizing device, such as a coil 18 for premagnetizing the medium 12. The apparatus 10 also includes a lamp 20 which emits heat radiations that are imaged on the medium 12 by a lens 21. The lamp 20 may be of a conventional incandescent type that emits light having a component in the infrared range.

The heater 16 is energized through a variable resistor 23 from s source of electric energy 24. A thermostat 26 is in heat-transfer relationship with the platen 15 and drives a conventional temperature control 26 which adjusts the electrical energization of the heater 16 through the variable resistor 23 so as to maintain the temperature $T_3$ of the platen 15 at a reasonably constant value between the temperatures $T_1$ and $T_2$. A switch 29 symbolizes a means for selectively turning the heater 16 on and off.

The magnetizing winding 18 is energized from a source of electric energy 30 through a variable resistor 31 and upon closure of a switch 32. Upon closure of a switch 35, the lamp 20 is energized from a source of electric energy 36 through a variable resistor 37.

If desired, the medium 12 may be premagnetized prior to insertion into the apparatus 10. As is well known in the art, such a premagnetization may be effected by a recording head structure, (not shown) that is preferably energized with a pulsating or alternating current so as to provide a multitude of magnetized lines on the medium 12 to promote large-area fill-in. This premagnetization may take place while the medium 12 is at a temperature below $T_2$.

Alternatively, the medium 12 may be premagnetized in the apparatus 10. To this effect, the switch 29 is enclosed so that the platen 15 heats the medium 12 through the substrate 13 to the temperature $T_3$. The information record 40 is replaced by a halftone plate 41 which is positioned between the lamp 20 and lens 21 and which defines a large number of small transparent apertures through which radiations from the lamp 20 can proceed. These radiations are imaged on the medium 12 12 by the lens 21 so as to raise the temperature of corresponding portions of the medium 12 to a value above $T_1$.

The switches 29 and 35 are thereupon opened so that the medium 12 can cool to a temperature below $T_2$. The switch 32 is closed so that the medium 12 is subjected to a magnetic field at least while the heated portions of the medium 12 cool through the lower Curie point transition at $T_2$. In this manner, the previously heated and now cooled portions of the medium 12 are strongly magnetized through the agency of thermoremanent magnetization and provide a magnetized halftone pattern that corresponds to the halftone pattern displayed by the mask 41.

In the embodiment illustrated in FIG. 2, the master record 40 defines an information pattern 44, such as an image or a text, by means of transparent portions 45 and opaque portions 46. By way of example, the master record 40 may be a photographic transparency of a writing or other object.

Preparatory to a magnetic imaging of the master record 40, the switch 29 is closed so that the medium 12 is heated to the temperature $T_3$ by the platen 15. The switch 35 is closed so that the lamp 20 irradiates the information record 40. Thermal radiations which penetrate the transparent record portions 45 are imaged by the lens 21 onto the medium 12. The variable resistor 37 is adjusted so that portions of the medium 12 which correspond to the transparent record portions 45 are heated to a temperature above the upper Curie temperature $T_1$. In other words, the lamp 20 and master record 40 cooperate in providing a thermal image of the information pattern 44 which is imparted to the medium 12 so as to heat portions of that medium which are representative of the information through the upper Curie transition $T_1$.

The latter temperature elevation causes a demagnetization of the information-representative portions in question, since $T_1$ designates a boundary between magnetic and nonmagnetic states for a heating of the medium 12.

Image-representative portions of the medium 12 having been rendered nonmagnetic, the switch 35 is opened so that the impression of the thermal image on the medium 12 ceases. This leads to a rapid dissipation of the thermal image in the medium 12 so that the information-representative portions return to the temperature $T_3$. If the medium 12 had the same or substantially the same Curie temperature for both heating and cooling, then the demagnetized information-representative portions would at least partially be remagnetized when these portions cool through the Curie point transition. This remagnetization would proceed by the phenomenon of thermoremanent magnetization rendered operative by the above mentioned premagnetization existing at portions of the medium 12 that have not been heated significantly above the temperature $T_3$. Since a magnetic printout agent cannot distinguish between premagnetized and remagnetized portions, the thermoremanent magnetization effect under discussion leads to an omission of fine image details and to a general degradation of image resolution and quality. The same applies if the information-representative demagnetized portions are in accordance with the prior art cooled through both Curie temperatures $T_1$ and $T_2$ prior to a printout or viewing of the magnetic images.

According to the subject invention, the medium 12 is maintained at the preheating temperature $T_3$ between the Curie temperatures $T_1$ and $T_2$ so that the demagnetized information-representative portions remain demagnetized when they cool from above $T_1$ back to $T_3$.

The magnetic image of the information thus produced on the medium 12 may be printed out by means of a magnetic toner 50 which is contained in a dispenser 51. The magnetic toner 50 typically is composed of magnetic toner particles 53. Suitable materials for the toner particles 53 include iron, nickel, cobalt or ferromagnetic alloys. By way of example and not by way of limitation, preferred materials for the toner particles 53 include small particles of iron, carbonyl iron, and magnetite ($Fe_3O_4$). A heater 55 driven by a thermostat-controlled source of energization 56 preheats the toner particles 53 to a temperature $T_3$ so that no detrimental cooling of the medium 12 takes place upon application of the toner 50. Toner particles 53 are applied to the medium 12 through a volume and flow rate controlled valve 57 in the dispenser 51. If desired, the medium 12 may be rocked or otherwise moved to promote the establishment of a toner image 59 of the information pattern 44. A heat-insulating enclosure 52 and thermostat-controlled air heating means (not shown) may be employed to maintain the environment of the medium 12 at the temperature $T_3$.

A sheet 60 of paper or of another printout material which corresponds in size to the medium 12 is disposed on a drum 61. The drum 61 is rotatably mounted on a pair of arms, one of which is visible at 63. After the toner image 59, only part of which is shown in FIG. 3, has been established on the medium 12, the arms 53 are thrust forward in the direction of the arrow 64, so that the drum 61 rolls along the surface of the medium 12 with the sheet 60 contacting the toner image 59. In accordance with the prior-art practice, the sheet 66 may have a tacky surface 66 which facilitates the transfer of the toner image 59 to the sheet 60 and the retention of that toner image on such sheet. The sheet 60 may also be preheated to the temperature $T_3$.

In accordance with prior-art practice, the toner particles 53 may individually be provided with shells (not shown) of a thermoplastic or other fusible material to facilitate a fusion of the toner image 53 to the sheet 60 which need then not be provided with a tacky surface 66.

I claim:

1. A method of providing a magnetic image of an information pattern, comprising in combination the steps of:

providing a magnetizable medium having a transition between a first state of magnetization and a second state of magnetization at a first temperature and a transition between said second state of magnetization and said first state of magnetization at a second temperature;

imparting to said medium a third temperature between said first and second temperatures so as to provide one of said first and second states of magnetization;

providing a thermal image of said information pattern; and imparting with the aid of said thermal image to portions of said medium representative of said information pattern said third temperature so as to provide at said portions the other of said first and second states of magnetization.

2. A method as claimed in claim 1, wherein:

said provision of said one state of magnetization includes a change in temperature of said recording medium in a first direction through one of said first and second temperatures and to said third temperatures; and said provision of said other state of magnetization includes a change in temperature of said information-representative medium portions from said third temperature in said first direction through the other of said first and second temperatures, and a change in temperature of said information-representative medium portions through said other temperature to said third temperature in a second direction opposite to said first direction.

3. A method as claimed in claim 1, wherein:

said provision of said one state of magnetization further includes a cycling of said medium in said first and second directions through said first and second temperatures prior to said change in temperature of said recording medium through said one temperature and to said third temperature.

4. A method of providing a magnetic image of an information pattern, comprising in combination the steps of:

providing a magnetizable medium displaying a transition from a magnetic state to a substantially nonmagnetic state at a first temperature upon heating of the medium, and a transition from said nonmagnetic state to said magnetic state at a second temperature below said first temperature upon cooling of the medium;

magnetizing said medium and heating said medium from below said second temperature to a third temperature between said first and second temperatures;

providing a thermal image of said information pattern; and imparting said thermal image to said magnetized medium so as to cycle portions of said magnetized medium representative of said information pattern from said third temperature through said first temperature, whereby said medium portions are demagnetized, and back through said first temperature to said third temperature, whereby said demagnetized medium portions remain demagnetized.

5. A method as claimed in claim 4, wherein:

said medium is magnetized prior to said heating from below said second temperature to said third temperature by heating said medium through said first and second temperatures, cooling said medium through said second and first temperatures, and exposing said medium to a magnetic field during the cooling of said medium.

6. A method as claimed in claim 4, including the further step of printing out said magnetic image represented by said magnetized medium and said information representative portions of said medium.

7. Apparatus for providing a record of an information pattern, comprising in combination:

a magnetizable medium having a transition between a first state of magnetization and a second state of magnetization at a first temperature and a transition between said second state of magnetization and said first state of magnetization at a second temperature;

means operatively associated with said magnetizable medium for imparting on said medium a third temperature between said first and second temperatures to provide one of said first and second states of magnetization;

means for providing a thermal image of said information pattern;

means operatively associated with said magnetizable medium for imparting with the aid of said thermal image to portions of said medium representative of said information pattern said third temperature and the other of said first and second states of magnetization to provide a magnetic image of said information pattern; and means operatively associated with said magnetizable medium for printing out said magnetic image.

8. Apparatus for providing a record of an information pattern comprising in combination:

a magnetizable medium displaying a transition from a magnetic state to a substantially nonmagnetic state at a first temperature upon heating of the medium, and a transition from said nonmagnetic state to said magnetic state at a second temperature below said first temperature upon cooling of the medium;

means operatively associated with said magnetizable medium for magnetizing said medium;

means operatively associated with said magnetizable medium for heating said medium from below said second temperature to a third temperature between said first and second temperatures;

means for providing a thermal image of said information pattern;

means operatively associated with said magnetizable medium for cycling, with the aid of said thermal image, portions of said magnetized medium representative of said information pattern from said third temperature through said first temperature and back through said first temperature to said third temperature whereby said medium portions are demagnetized and together with the remainder of said medium provide a magnetic image of said information pattern; and means operatively associated with said magnetizable medium for printing out said magnetic image.

9. Apparatus as claimed in claim 8, wherein:

said magnetizing means include means for heating said medium through said first and second temperatures, cooling said medium through said second and first temperatures, and exposing said medium to a magnetic field during the cooling of said medium.

* * * * *